(12) United States Patent
Malik

(10) Patent No.: US 6,335,968 B1
(45) Date of Patent: Jan. 1, 2002

(54) SYSTEM AND METHOD FOR PRE-PAID AND PAY-PER-USE INTERNET SERVICES

(75) Inventor: Dale W. Malik, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/409,686

(22) Filed: Sep. 30, 1999

(51) Int. Cl.$^7$ .............................................. H04M 15/00
(52) U.S. Cl. .............................. 379/114.2; 379/114.28; 379/114.29; 379/114.17
(58) Field of Search ........................ 379/114.01, 114.03, 379/114.2, 114.28, 114.29, 127.01, 127.02, 127.03, 228, 229, 230

(56) References Cited

U.S. PATENT DOCUMENTS

| | | | |
|---|---|---|---|
| 5,701,301 A | | 12/1997 | Weisser, Jr. |
| 5,722,067 A | * | 2/1998 | Fougnies et al. ........... 379/114 |
| 5,745,556 A | * | 4/1998 | Ronen ......................... 379/127 |
| 5,774,533 A | | 6/1998 | Patel |
| 5,864,610 A | * | 1/1999 | Ronen ......................... 379/127 |
| 5,905,736 A | * | 5/1999 | Ronen et al. ................ 379/127 |
| 6,026,151 A | * | 2/2000 | Bauer et al. ................. 379/115 |
| 6,084,953 A | * | 7/2000 | Bardenheuer et al. ...... 379/114 |
| 6,088,431 A | * | 7/2000 | Ladue ......................... 379/114 |
| 6,104,704 A | * | 8/2000 | Buhler et al. ............... 379/114 |
| 6,188,752 B1 | * | 2/2001 | Lesley ........................ 379/114 |
| 6,246,755 B1 | * | 6/2001 | Walker et al. .............. 379/115 |

FOREIGN PATENT DOCUMENTS

| | | |
|---|---|---|
| EP | 0 954 148 A | 3/1999 |
| EP | 0 954 148 A | 11/1999 |
| WO | WO 96 15616 A | 5/1996 |
| WO | WO 98 21874 A | 5/1998 |
| WO | WO 98 21874 | 5/1998 |

OTHER PUBLICATIONS

Rigney et al., "Remote Authentication Dial–In User Service(RADIUS)", Network Working Group, Jan. 1997.
Rigney et al., "RADIUS Accounting", Network Working Group, Apr. 1997.

* cited by examiner

Primary Examiner—Curtis Kuntz
Assistant Examiner—Rexford Barnie
(74) Attorney, Agent, or Firm—Shaw Pittman LLP

(57) ABSTRACT

A telecommunications system and method for providing access to the Internet on a pre-paid or pay-per-use basis that utilizes an Advanced Intelligent Network ("AIN") to set up a dial up connection between a subscriber and an Internet Service Provider ("ISP"). The telecommunications system communicates with the ISP's computer systems to coordinate verification of callers attempting access to the ISP. The system uses features of the AIN to identify a call as a pre-authorized call so that the ISP grants access without requiring a username and a password from a caller. If the ISP receives a call that is not so identified, the caller is treated as regular ISP subscriber, and requires a username and a password to authenticate the caller prior to granting access to the ISP's resources. The present invention further utilizes the telephone service provider's billing systems to aggregate bills and collect revenue from subscribers. A portion of the revenue is retained by the telephone service provider as a fee for providing the service, and a portion is paid to the ISP as payment for its services.

15 Claims, 4 Drawing Sheets

SYSTEM AND METHOD FOR PRE-PAID AND PAY-PER-USE INTERNET SERVICES

BACKGROUND

1. Field of the Invention

The present invention relates generally to telecommunications systems. More particularly, the present invention relates to an advanced intelligent network system for Internet service provision on a per-use basis. The present invention also provides pre-paid Internet service connections.

2. Background of the Invention

Over the last ten years, use of the Internet has grown rapidly. A large segment of this growth stems from an increase in individual dial-up subscribers. These dial-up subscribers use the public switched telephone network ("PSTN") to establish connections to their Internet Service Providers ("ISPs"). In many cases, individual subscribers are required to enter into long-term contractual agreements when they sign up for Internet service. Such long-term agreements are generally required to reduce the ISP's overhead in creating accounts and billing subscribers. However, many subscribers find such long term agreements undesirable.

Strong competition exists among the many ISPs in the marketplace for acquiring new customers and for retaining existing customers. Subscribers entering the market for ISP services may prefer trying out different ISPs before making a long term commitment to the service. Thus, rather than entering into a long-term agreement with a single ISP, such new customers may desire a system providing access to multiple ISPs on a pre-paid or pay-per-use basis. Similarly, for privacy or security reasons, subscribers may prefer the option of using several different ISPs on a recurring basis. Under the conventional systems and methods for accessing an ISP, a user would have to subscribe to many services, thereby incurring multiple monthly fees to achieve this result. Again, these subscribers may prefer a system providing access to multiple ISPs on a pre-paid or pay-per-use basis.

One reason such pre-paid or pay-per-use services are not readily available in conventional ISP systems and methods is that the overhead for tracking and billing customers outweighs the benefits of catering to the needs of these customers. Additionally, some ISPs may view such short term arrangements as cutting into their customer base without providing the financial returns to justify the cost. It is commonly known in the art that tracking and billing systems are complex and expensive to operate. To accurately bill customers for units used requires a complex infrastructure of hardware, software and personnel resources. If the monthly bill per subscriber is a low dollar amount, then bill collection procedures may not be cost-effective without additional leverage to encourage payment. For these and similar reasons, ISPs have been reluctant to provide pre-paid or pay-per-use Internet access services. Thus, there remains a need for a system that provides access to multiple ISPs on a pre-paid or pay-per-use basis and does not increase the ISPs' overhead.

In conventional ISP systems, the PSTN is used merely to connect the caller to the ISP. The PSTN does not verify the caller and does not track the caller's usage of the ISP's resources. FIG. 1 is a schematic diagram illustrating how dial-up subscriber 30 connects to ISP 20 using PSTN 10. Dial-up subscriber (also referred to as "caller" herein) 30, places a call over PSTN 10 using computer 31, modem 32 and subscriber line 33. Within PSTN 10, the call is processed by the caller's Service Switching Point ("SSP" or "switch," herein) 11 and the ISP's SSP 12. To support multiple connections, ISPs must maintain numerous telephone lines connected to modems. Rather than advertising a different telephone number for each telephone line, ISPs generally advertise a limited number of telephone access numbers. Each telephone access number corresponds to one or more telephone lines. These telephone lines may be made up of, e.g., individual POTS lines, one or more T1 lines, or Primary Rate ISDN ("PRI") lines. For simplicity, the figures and discussion herein show the connection to be made up of PR1 lines 21, as shown in FIG. 1.

PR1 lines 21 lead to ISP 20 where they are connected to multi-line hunt group ("MLHG") 22 as shown in FIG. 1. MLHG 22 is modem pool allowing multiple simultaneous connections and is controlled by access server 23. MLHG 22 takes incoming subscriber calls and routes them to the first open modem in the modem pool. When a caller dials the telephone access number for ISP 20, from the PSTN's point of view, the call is processed like any other call in PSTN 10. That is, the call is routed between the caller and called party (in this case, ISP 20) through one or more switches. If ISP 20's lines are all busy, or "off-hook", i.e., there are no voice communications paths available, the caller gets a busy-signal, which is provided by the PSTN. On the other hand, if lines are available, switch 12 will terminate the call to ISP 20 and it is ISP 20's responsibility to answer the call, verify the caller's authorization for access to ISP 20, and setup the caller's connection to the Internet.

From ISP 20's point of view, several intervening steps must be accomplished before granting the caller access to the Internet. When a call reaches ISP 20 via PRI lines 21 and MLHG 22, access server 23 answers the call. After answering the call, access server 23 must determine whether or not the caller should be granted access and if so, to which services. Access server 23 queries the caller for information such as a username and password for use in identifying the caller and the caller's authorized services. The dialog between the caller and access server 23 is usually performed automatically between access server 23 and communications software operating on the caller's computer 31.

Generally, ISPs use centralized servers to store and manage its subscriber databases. Remote Authentication Dial-In User Service ("RADIUS") server 24, having database 24a, shown in FIG. 1, is functionally connected to access server 23 and provides this centralized management. Thus, access server 23 collects username and password information from the subscriber and passes it on to RADIUS server 24. After RADIUS server 24 verifies a subscriber's username and password, it provides access server 23 with configuration information specific to the caller. Access server 23 uses the configuration information to provide the authorized services to the caller. Access servers and RADIUS servers are described in more detail in commonly assigned U.S. patent application, Ser. No. 09/133,299, which is incorporated herein by reference in its entirety. Additional information on access servers and RADIUS servers may be found in Rigney et al., Remote Authentication Dial-In User Service (RADIUS), Network Working Group, January, 1997, or in Rigney et al., RADIUS Accounting, Network Working Group, April, 1997.

The conventional system and methods described above pose a further obstacle to providing pre-paid Internet services. As noted above, typically every ISP subscriber is assigned a unique username and password. Typically, the subscriber may change the password, but the username remains fixed to ensure it is unique. The combination of username and password allows for verification to ensure the user has permission (i.e., is an authorized customer) to use ISP 20's services. Pre-paid telecommunications services are desirable in one respect because of the inherent anonymity that may be gained. However, under the current systems and methods, ISPs generally demand some means to track the usage of their resources to a specific account for billing purposes.

SUMMARY OF THE INVENTION

The present invention is a system and method for providing subscribers with pre-paid and pay-per-use access to multiple Internet Service Providers ("ISPs"). The present invention utilizes an Advanced Intelligent Network ("AIN") to set up and manage the services as described below. AIN systems are described in U.S. Pat. No. 5,701,301 and U.S. Pat. No. 5,774,533, which are incorporated herein by reference in their entirety. FIG. 2 shows the key components of the AIN used in the present invention. FIGS. 3a and 3b are flowcharts detailing the steps comprising a preferred embodiment of the present invention. The steps described herein can be performed by computer-readable program code operating on the various AIN components and other computer systems, as described below.

The present invention is implemented as an AIN service application. At least one telephone access number assigned to each ISP is provisioned with a suitable AIN trigger on the terminating switch. When a user, presumably using a computer and modem, calls a telephone access number having the trigger, the call is temporarily suspended while a database query is processed. The database query is sent from a Service Switching Point ("SSP" or "switch") to a Service Control Point ("SCP"), which checks to see whether the caller has blocked access to the pay-per-use service, or has an unknown number.

In a preferred embodiment, if the call is not from a blocked or unknown number, the SCP checks to see if the caller has a pre-paid subscription. If so, the SCP then checks to see whether the caller has some pre-paid units available. In one embodiment, the call is processed as a regular non-pre-paid and non-pay-per-use call if the caller is pre-paid but has no remaining pre-paid units. In an alternative embodiment the call is still processed as a pay-per-use call even when a pre-paid caller has no pre-paid units left.

In a preferred embodiment, blocked or unknown numbers are not processed by the pre-paid or pay-per-use Internet service. Instead, calls from blocked or unknown numbers are terminated by the ISP's switch without any changes to the call parameters. In this case, the caller must have a valid account with the ISP in order to access the Internet through that ISP. Furthermore, billing for caller's use of the ISP's services are handled by the ISP, not by the telephone network.

If the caller is a pre-paid or a pay-per-use customer, the SCP changes certain call parameters in the call setup message, as described below, and instructs the SSP to continue processing the call with the new parameters. The SCP further instructs the SSP to inform the SCP if the line was busy, answered or the caller hung up before the call was answered. Additionally, if the call was answered, the SSP notifies the SCP when the call is disconnected. The SCP uses this information to track the subscriber's usage of the system for billing purposes. If the caller was pre-paid, the SCP subtracts the number of units used from the pre-paid units available for the subscriber. If the caller was processed under the pay-per-use system, the charge is calculated by the telephone service provider and included in the caller's telephone bill for the period. Billing techniques for such pay-per-use telephone connections are well known in the art of telephone service providers.

Authentication of pre-paid and pay-per-user callers is still performed by the ISP's RADIUS server, as described above. However, in the present invention, the SCP generates a transaction identification ("ID") that serves as a pseudo username and password. The transaction ID is a ten digit number chosen specifically to be an invalid telephone number. The SCP inserts the transaction ID into the calling party number ("CgPN") field when the SCP instructs the SSP to proceed with call setup. Because such an invalid telephone number can only be placed in the CgPN field by the telephone service provider, the ISP will identify the caller as being billed through the telephone system and not the ISP. When a pre-paid or pay-per-use call is terminated to the ISP's multi-line hunt group, the RADIUS server authorizes connection to the ISP's services because the CgPN is recognized as a transaction ID generated by the SCP.

It is an object of the present invention to provide Internet access to subscribers on a pre-paid basis as well as on a pay-per-use basis.

It is a further object of the present invention to use an Advanced Intelligent Network to provide and manage Internet access to subscribers on a pre-paid basis as well as on a pay-per-use basis.

It is another object of the present invention to provide Internet access to subscribers on a pre-paid basis as well as on a pay-per-use basis without prohibitively increasing overhead for Internet Service Providers.

It is an object of the present invention to provide an integrated bill to subscribers obtaining access to multiple Internet Service Providers on a pre-paid basis and a pay-per-use basis.

These and other objects of the present invention are described in greater detail in the detailed description of the invention, the appended drawings and the attached claims.

DETAILED DESCRIPTION OF THE INVENTION

Figure 2:
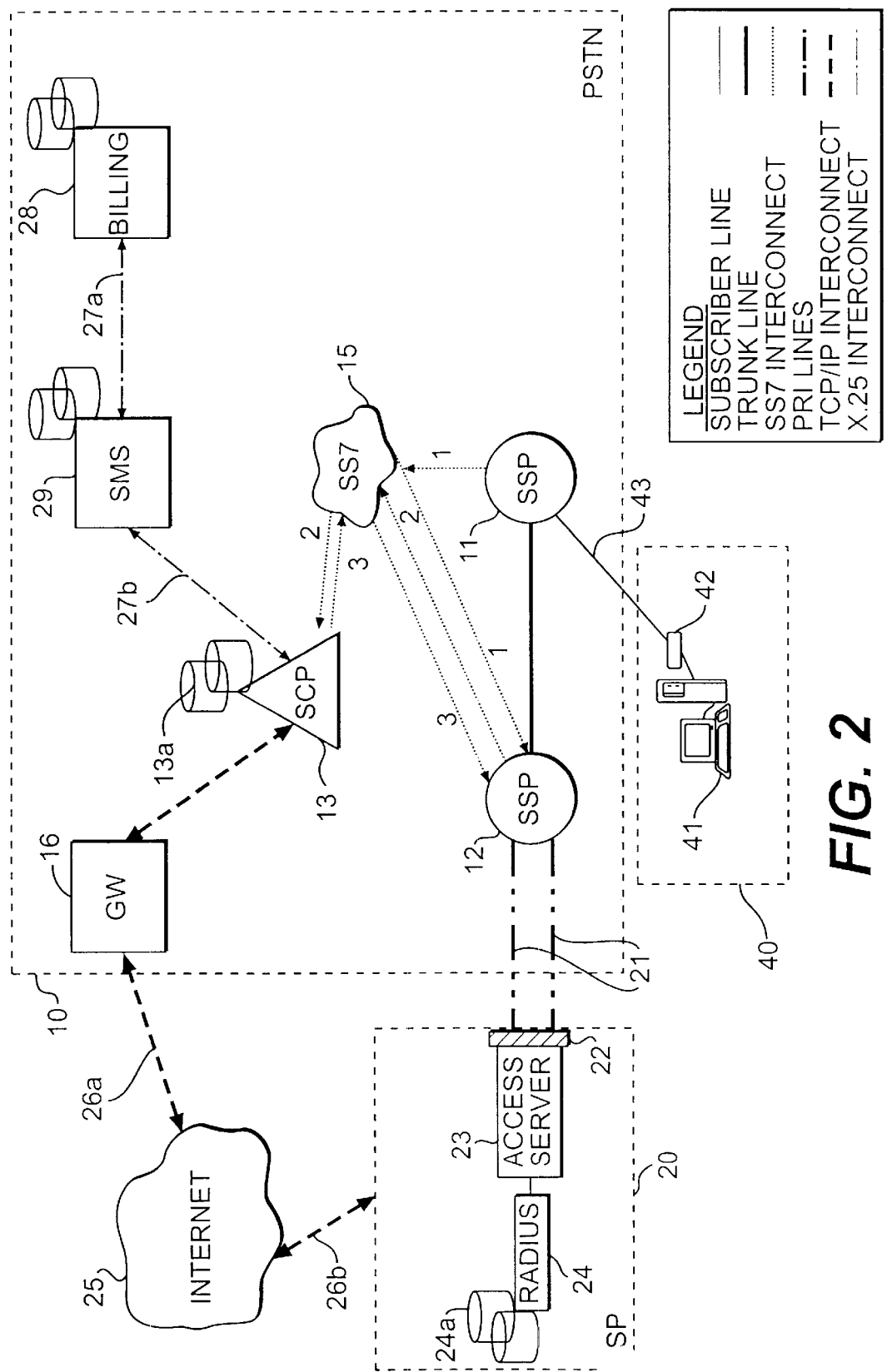
FIG. 2 is a schematic diagram of the main components of a telephone service provider's telephone network utilizing a Advanced Intelligent Network and an Internet Service Provider's network used in establishing a dial-up connection according to the present invention.

The present invention utilizes an Advanced Intelligent Network ("AIN") to provide a system and method for allowing individual users to access multiple Internet Service Providers ("ISPs") on a pre-paid or pay-per-use basis. Users of the present invention gain access to the ISPs using dial-up telephone connections. FIG. 2 shows the key components of the AIN used in the present invention. Such AIN components include Service Switching Points ("SSPs") 11 and 12, a Service Control Point (SCP) 13, and a Common Channel Signaling System 7 ("SS7") data network 15. FIG. 2 shows two distinct SSPs, the caller's SSP 11 and ISP 20's SSP 12. The subscriber and ISP could be served by the same SSP, or they could be served by distinct SSPs as shown in FIG. 2. SCP 13 responds to queries from the SSPs using database 13*a* and service package applications ("SPAs"), i.e., software systems running on SCP 13.

Billing services in a preferred embodiment are accomplished using the standard records commonly used in telephone billing systems. Telephone billing systems and records used in AIN systems are described in U.S. Pat. No. 5,774,533, referenced above. Billing records are created by the pay-per-use system of the present invention and are periodically transferred, in aggregate form, to billing system 28. Records are transferred from SCP 13 through Service Management System ("SMS") 29 to billing system 28 via interconnects 27*a* and 27*b*. Interconnects 27*a* and 27*b* may use any suitable data transmission protocol, such as TCP/IP. In a preferred embodiment, interconnects 27*a* and 27*b* employ the X.25 protocol. SMS 29 and billing system 28 have databases 29*a* and 28*a*, respectively. SMS 29 is used to manage and synchronize service applications and databases within telephone network 10. Billing system 28 is used to generate customer bills on a periodic (usually monthly) basis.

Figure 1:
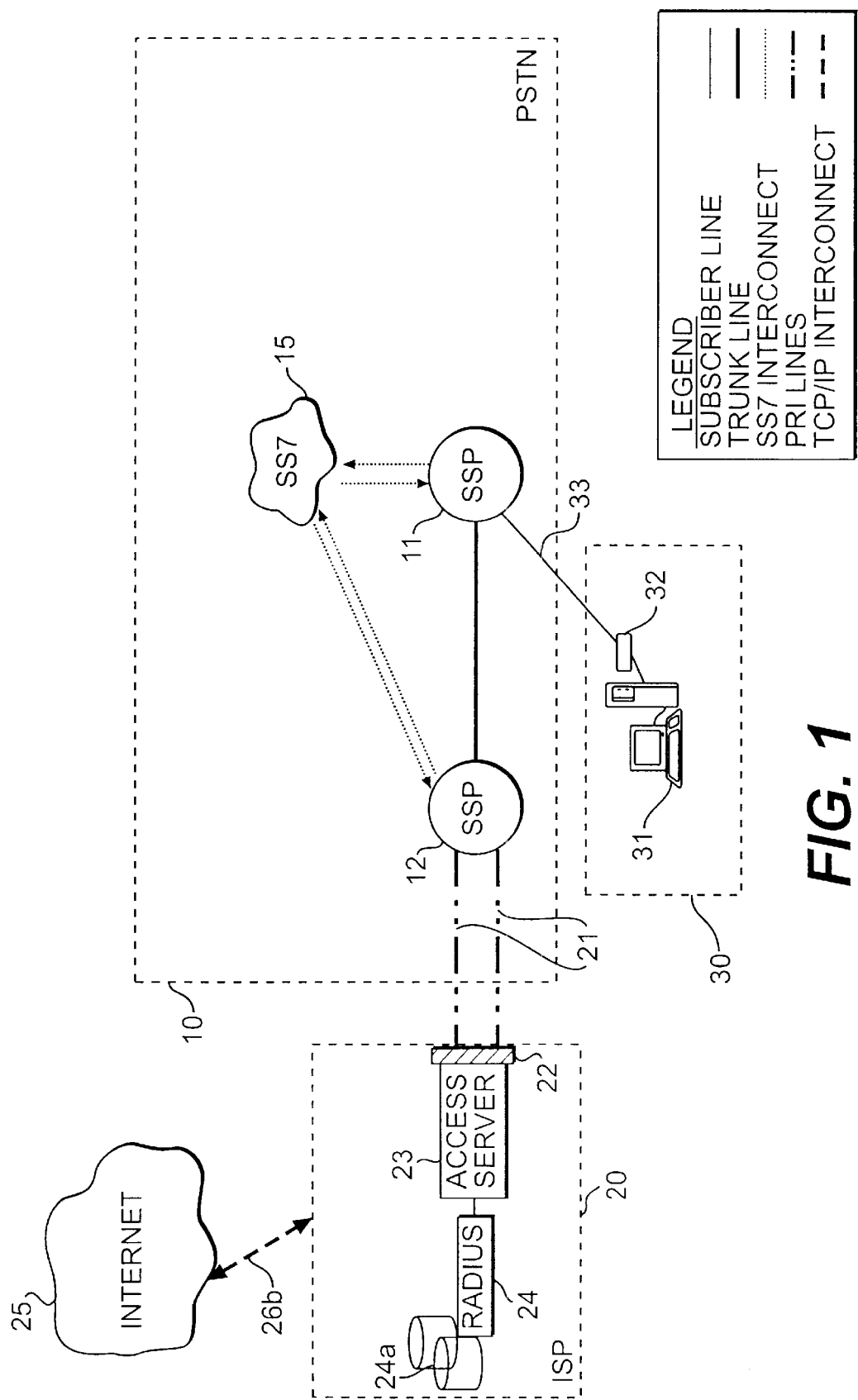
FIG. 1 is a schematic diagram of the main components of a telephone service provider's network and an Internet Service Provider's network used in establishing a dial-up connection to the Internet in conventional ISP systems.

In addition to the AIN components, FIG. 2 shows gateway server 16, which acts as a buffer between the telephone network 10 of the present invention and the Internet 25. (For simplicity, the Internet is labeled as item "25" in FIG. 1, but will only be referred to hereafter as "the Internet" without numeric identification). Gateway server 16 is connected to ISP 20 via the Internet through TCP/IP interconnections 26*a* and 26*b*. Alternatively, gateway server 16 could be directly connected to ISP 20 via a private high speed link. ISP 20 has access server 23 connected to PRI lines 21 and RADIUS server 24 providing user verification and authorization as described above.

At least one telephone access number assigned to each ISP is provisioned with a suitable AIN trigger. In a preferred embodiment, a Public Office Dialing Plan ("PODP") trigger is utilized. As is well known in the art, a PODP trigger can be provisioned on either end of the call. That is, the trigger may be on the originating switch or on the terminating switch. When a user, presumably using a computer and modem, calls a telephone access number having the PODP trigger, the call is temporarily suspended while a database query is processed. The database query is issued by the switch where the PODP trigger is actually provisioned, e.g., the terminating switch.

Examples 1 and 2 below each describe a specific implementation of the present invention. However, the present invention may be implemented using many variations of the sequences described in Examples 1 and 2.

EXAMPLE I

Figure 3A:
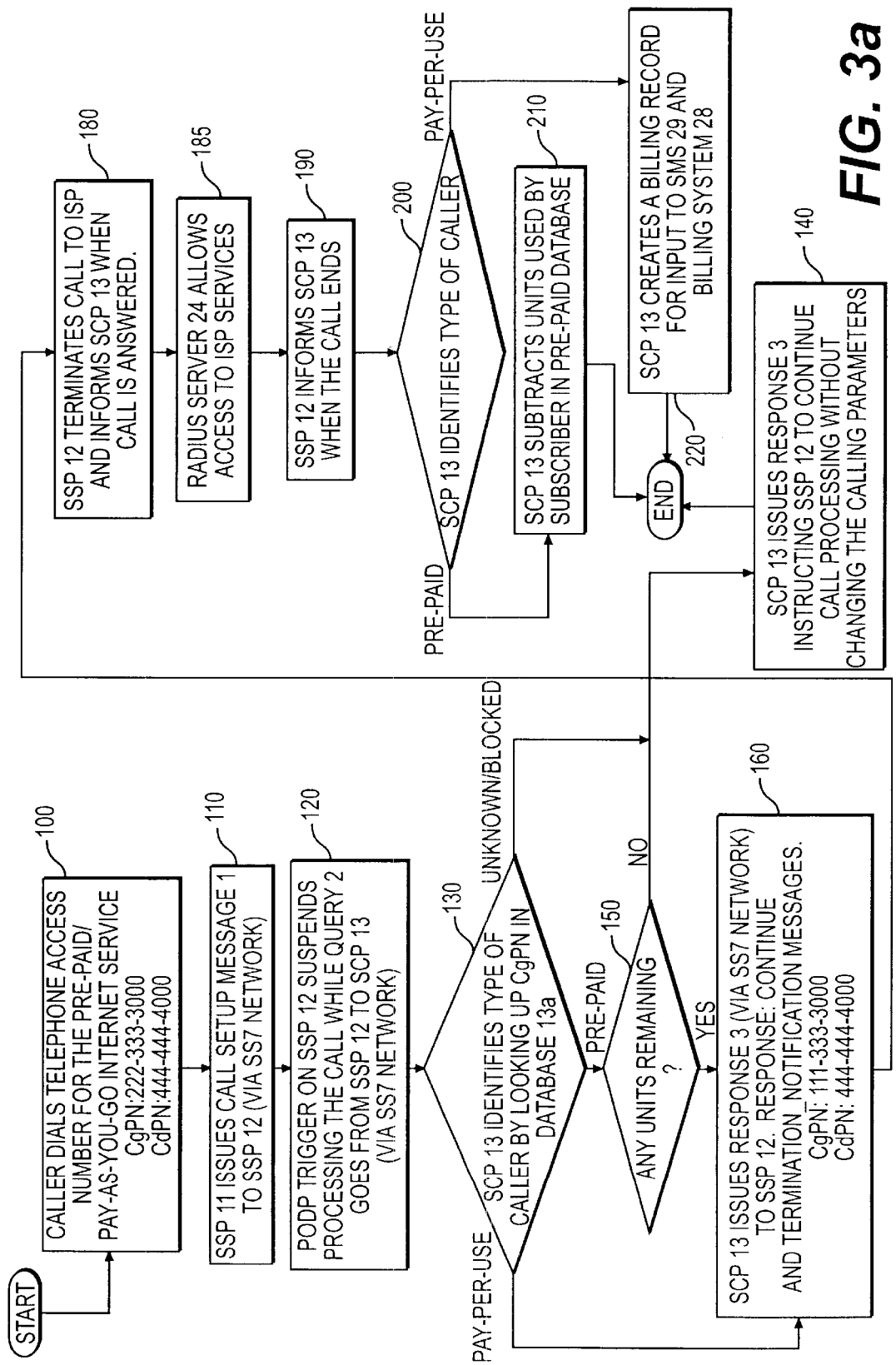
FIG. 3a is a flow diagram showing the steps executed in an example illustrating one embodiment of the present invention.

As shown in FIG. 3*a*, a subscriber (or caller) accesses the Internet using the pre-paid or pay-per-use system of the present invention by dialing the telephone access number for a given ISP (step 100). Each ISP is assigned a different telephone access number, e.g., 222-333-1000 may be assigned to one ISP and 444-444-4000 may be assigned to another. In this example, caller 40 dials 444-444-4000 using computer 41 and modem 42 (shown in FIG. 2). Modem 42 is connected to subscriber line 43, having a telephone number of 222-333-3000 on SSP 11. Thus, the Calling Party Number ("CgPN") is 222-333-3000 and the Called Party Number ("CdPN") is 444-444-4000. In step 110, caller 40's switch, SSP 11, sends initial address message ("IAM") message 1 over SS7 network 15 to ISP 20's switch, SSP 12. IAM message 1 is an Integrated Services Digital Network User Part ("ISUP") message informing SSP 12 that a caller is trying to place a call to 444-444-4000. As discussed above, a PODP trigger may be provisioned on either the originating or the terminating switch. In the present example, the PODP trigger is provisioned on SSP 12. Thus in step 120, SSP 12 initiates database query 2 to SCP 13. Query 2 is a Transaction Capabilities Application Part ("TCAP") message transmitted from SSP 12 to SCP 13 over SS7 network 15. In an alternate embodiment, the PODP trigger is provisioned on SSP 11. In this alternate embodiment, SSP 11 issues the database queries, described herein, prior to sending IAM message 1 to SSP 12.

In the preferred embodiment shown in FIG. 3*a*, access to the pre-paid or pay-per-use Internet service of the present invention is available by default, on all subscriber lines. In this preferred embodiment, a subscriber may block access on a temporary or permanent basis by contacting the telephone service provider. In an alternate embodiment, access to the services is denied by default. In this embodiment, subscribers must affirmatively request access from the telephone service provider.

In step 130, SCP 13 determines the type of call, i.e., whether or not the call is from an unknown or blocked telephone number, or if the call will be billed on pre-paid or pay-per-use basis. SCP 13 looks up the CgPN in database 13*a* to make this determination. In a preferred embodiment, database 13*a* comprises the line information database ("LIDB"), which is well known in the art. If the number is blocked or unknown, SCP 13 moves on to step 140, described below. If call is from a line having pre-paid access to the Internet service SCP 13 moves on to step 150. Otherwise, if SCP 13 determines the call should be billed as a pay-per-use Internet call, SCP 13 moves on to step 160.

Step 140 is performed if the call is from an unknown number, or a blocked telephone line or if SCP 13 determines in step 150 that a pre-paid subscriber has no remaining pre-paid units. In step 140, SCP 13 issues a Continue message to SSP 12 (response 3 in FIG. 2). The Continue message contains no changes in the call setup parameters, i.e., the CgPN is still set to 222-444-3000. SSP 12 then terminates the call to MLHG 22 and ISP 20 takes over responsibility for authenticating the user, i.e., ISP 20's RADIUS server 24 treats the call as a call from an ordinary customer. This is possible because RADIUS server 24 is programmed to check the CgPN to determine if the call is to be treated as a preauthorized call, i.e., authorized through the telephone service provider. If RADIUS server 24 determines that the call is not pre-authorized, it waits for a valid username and password from caller 40 before allowing access to ISP 20's resources. In a preferred embodiment, when step 140 is executed, it is the last step performed by the present invention.

In step 140, SCP 13 optionally issues a Send_to_ Resource message and SSP 12 plays an announcement to caller 40 before terminating the call. The announcement informs caller 40 that pre-paid and pay-per-use Internet service is not currently available from caller 40's telephone line. In an alternate embodiment, rather than terminating the call to ISP 20, SSP 12 plays an announcement then disconnects the call.

For pre-paid Internet calls, SCP 13 checks the number of pre-paid units available for caller 40's account (step 150).

The pre-paid units may correspond to the number of minutes allowed, or the number of times the system has been accessed, or some other method for quantifying usage of the pre-paid Internet service. If pre-paid units are available, SCP 13 moves on to step 160, described below. If pre-paid units are not available, SCP 13 proceeds to step 140 where the call is processed as a regular call (i.e., not pre-paid and not pay-per-use call) as described above. SCP 13 may optionally play an announcement informing caller 40 that no pre-paid units are available, before proceeding to step 140.

If caller 40 has remaining pre-paid units, SCP 13 sends a Continue and Termination_Notification messages in response 3 to SSP 12 (step 160). The Continue message instructs SSP 12 to proceed with the call setup between caller 40 and ISP 20's telephone access number. However, SCP 13 inserts a transaction ID in the CgPN field before issuing the Continue message. As discussed earlier, the transaction ID is a number that cannot represent a true telephone number. The presence of this "erroneous" telephone number in the CgPN field informs RADIUS server 24 that the call is pre-authorized for access to ISP 20's resources.

In a preferred embodiment, the transaction ID is formed by replacing the area code of the calling party number with "111." The area code may be encoded so that the last 2 digits represent the time remaining on the pre-paid account. Other encodings are also possible. Thus in the present example, the new CgPN is set to 111-333-3000, while the CdPN remains unchanged. Under the current telephone networking protocols, "111" is not a valid area code. Of course, the transaction ID could be any other string that notifies RADIUS server 24 that caller 40 will be billed through the telephone network and should be granted access to the Internet without further authentication. The Termination_Notification message instructs SSP 12 to alert SCP 13 if the line is busy, answered or not answered, and if the call was answered, when that call is eventually disconnected. This allows SCP 13 to track the usage of the Internet service by caller 40.

In step 180, SSP 12 terminates the call to ISP 20 over PRI lines 21 and informs SCP 13 when the call is answered by access server 23. In the present example, access server 23 is programmed transmit the calling party number to RADIUS server 24. In step 185, RADIUS server 24 checks the CgPN received from access server 23 and authorizes access to ISP 20's services if the special code has been appended to a portion of the CgPN. If the CgPN does not contain the special code, RADIUS server 24 treats the call as a normal call to ISP 20. In that case, RADIUS server 24 waits for caller 40 to transmit a username and password as previously described.

In step 190, SSP 12 notifies SCP 13 when the call is disconnected. In step 200, SCP 13 again determines the type of caller so that caller 40 can be correctly billed for the call. If caller 40 is a pre-paid user of the service, then SCP 13 subtracts the number of units used in from the subscriber's pre-paid units stored in database 13a (step 210). If caller 40 is a pay-per-use user of the service, then SCP 13 generates a billing record for caller 40's telephone number (step 220). Billing records are transferred at regular intervals, preferably once per day, between SCP 13 and SMS 29 and billing system 28. Billing system 28 generates a monthly bill for caller 40, including all charges for the units used in the pay-per-use Internet service.

EXAMPLE II

Figure 3B:
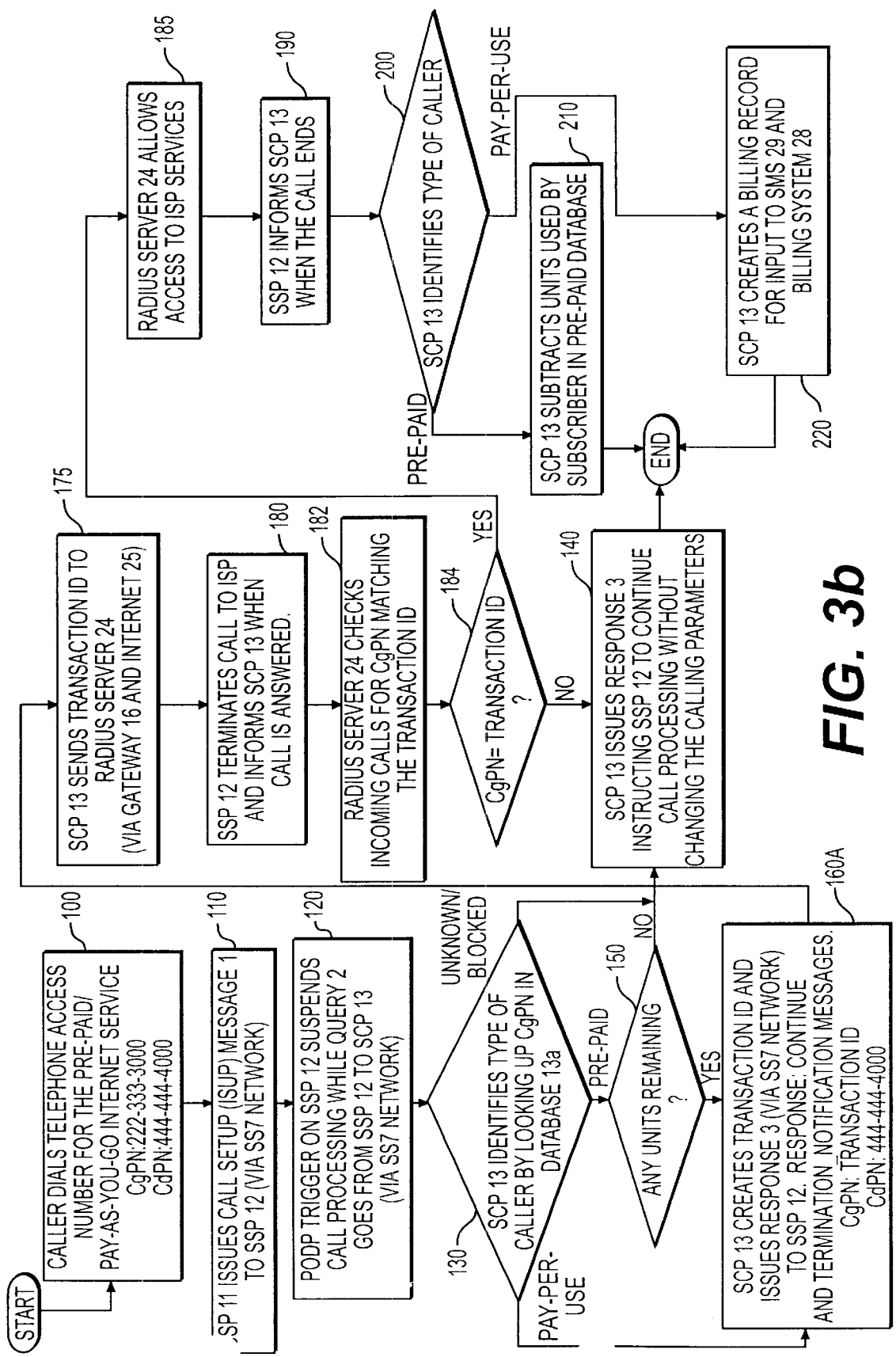
FIG. 3b is a flow diagram showing the steps executed in an example illustrating another embodiment of the present invention.

This example uses many of the same steps as Example I. However, in this example, SCP 13 sends a message to RADIUS server 24 informing RADIUS server 24 of caller 40's transaction ID. This allows enhanced security of the system because RADIUS server 24 can verify the transaction ID prior to granting access to ISP 20's resources. As shown in FIG. 3b, steps 100 through 150 are identical to the like-numbered steps from Example I (shown in FIG. 3a). A new step 160A replaces step 160 as follows: instead of changing the actual CgPN by including a special code to identify the call as a pre-authorized user, SCP 13 generates a unique transaction ID, and inserts the transaction ID in place of the actual CgPN.

In new step 175, SCP 13 transmits the transaction ID to RADIUS server 24. This message is transmitted via gateway server 16 through the Internet to RADIUS server 24. After the call is connected in step 180, RADIUS server 24 checks all incoming calls to see if the CgPN of the incoming call matches the transaction ID in new step 182. In new step 184, if the CgPN matches the transaction ID, RADIUS server 24 moves on to steps 185 through 220, as described in Example I above. Otherwise, if the CgPN does not match the transaction ID, RADIUS server 24 moves on to step 140, and treats the call as a normal call to ISP 20, as described above.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. In a telephone network, a method for providing pre-paid and pay-per-use access to an internet service provider using a billing system of the telephone network comprising the steps of:
   (a) establishing a database on a service control point comprising a pre-paid subscriber's telephone number, an amount of pre-paid units and a blocked subscriber's telephone number;
   (b) provisioning a trigger on an internet service provider telephone number on a switch in the telephone network;
   (c) transmitting a query from the switch to the service control point when a call to the internet service provider telephone number arrives at the switch, thereby activating the trigger, wherein the query comprises a calling party number and the internet service provider telephone number;
   (d) determining whether the calling party number is a pre-paid number, a pay-per-use number, an unknown number or a blocked number;
   (e) transmitting a termination instruction from the service control point to the switch, wherein when the calling party number is either a pre-paid number or a pay-per-use number, a pre-determined code is inserted into a calling party field, and wherein when the calling party number is either the unknown or the blocked number the calling party number is in the calling party field;
   (f) sending a first notification message and a second notification message from the switch to the service control point when the calling party number is a pre-paid or pay-per-use number, said first notification message being sent when the call begins and said second notification message being sent when the call ends;

(g) billing the calling party number for a usage amount when the calling party number is a pre-paid or pay-per-use number; and (h) updating the billing system when the calling party number is a pre-paid or pay-per-use number.

2. The method of claim 1, wherein when the step of determining whether the calling party number is a pre-paid number, a pay-per-use number, a foreign number or a blocked number comprises comparing the calling party number to a number stored in the database.

3. The method of claim 1, wherein the usage amount is determined by comparing the first notification message to the second notification message.

4. The method of claim 3, wherein the usage amount is subtracted from the pre-paid units in the database when the calling party number is a pre-paid number.

5. The method of claim 3 wherein the usage amount is recorded in the database when the calling party number is a pay-per-use number.

6. The method of claim 1, wherein the trigger is a public office dialing plan trigger.

7. The method of claim 1, wherein the amount of pre-paid units is a quantity of time.

8. The method of claim 1, wherein the amount of pre-paid units is a quantity of connections.

9. The method of claim 1, wherein the pre-determined code comprises a portion of the calling party number and a set of pre-determined digits.

10. A telephone network for providing pre-paid or pay-per-use access to an internet service provider, comprising:

(a) a service control point having a database, said database comprising a pre-paid subscriber's telephone number, an amount of pre-paid units and a blocked subscriber's telephone number;

(b) a switch in communication with the service control point, said switch having an internet service provider telephone number and a trigger provisioned on said internet service provider telephone number;

(c) an access control server in communication with the switch, wherein said access control server determines a calling party number before answering an incoming call; and (d) a billing system in communication with the service control point, wherein when a call is placed to the internet service provider telephone number, the switch queries the service control point to determine whether the calling party number is a pre-paid number, a pay-per-use number, an unknown number or a blocked number, wherein the service control point provides a response to the switch, said response instructing the switch to terminate the call to the internet service provider telephone number when the calling party number is a pre-paid number or a pay-per-use number, and wherein said response comprises a calling party field including a pre-determined code, and wherein the access control server grants access to the internet service provider without requiring a username or a password if the call has the predetermined code in the calling party field.

11. The telephone network of claim 10, wherein the pre-determined code comprises a pre-selected set of digits appended to a portion of the calling party number.

12. The telephone network of claim 10, wherein the access control server requires a username and a password when the call does not have the pre-determined code in the calling party field.

13. The telephone network of claim 27, wherein the response from the service control point to the switch comprises an instruction to disconnect the call when the call is unknown or blocked.

14. The telephone network of claim 13, wherein the response further comprises an instruction to play an announcement before disconnecting the call.

15. The telephone network of claim 27, wherein the billing system generates a bill when the call is a pay-per-use number.

* * * * *

UNITED STATES PATENT AND TRADEMARK OFFICE
CERTIFICATE OF CORRECTION

PATENT NO. : 6,335,968 B1
DATED : January 1, 2002
INVENTOR(S) : Dale W. Malik

It is certified that error appears in the above-identified patent and that said Letters Patent is hereby corrected as shown below:

<u>Column 10,</u>
Lines 28 and 36, change "claim 27," to -- claim 10, --.

Signed and Sealed this

Twenty-third Day of May, 2006

JON W. DUDAS
*Director of the United States Patent and Trademark Office*